US008149168B1

(12) United States Patent
Rabinowitz et al.

(10) Patent No.: US 8,149,168 B1
(45) Date of Patent: *Apr. 3, 2012

(54) POSITION DETERMINATION USING WIRELESS LOCAL AREA NETWORK SIGNALS AND TELEVISION SIGNALS (75) Inventors: Matthew Rabinowitz, Portola Valley, CA (US); Todd Young, San Jose, CA (US); James J. Spilker, Jr., Woodside, CA (US)

(73) Assignee: TruePosition, Inc., Berwyn, PA (US)

( * ) Notice: Subject to any disclaimer, the term of this patent is extended or adjusted under 35 U.S.C. 154(b) by 1182 days.

This patent is subject to a terminal disclaimer.

(21) Appl. No.: 11/622,838

(22) Filed: Jan. 12, 2007

Related U.S. Application Data

(60) Provisional application No. 60/759,857, filed on Jan. 17, 2006.

(51) Int. Cl.
*G01S 3/02* (2006.01)
(52) U.S. Cl. .......................... 342/450; 342/465
(58) Field of Classification Search .................. 342/450, 342/453, 457, 463–465; 455/456.6, 457
See application file for complete search history.

(56) References Cited

U.S. PATENT DOCUMENTS

| 4,555,707 A | 11/1985 | Connelly |
| 4,652,884 A | 3/1987 | Starker |
| 4,700,306 A | 10/1987 | Wallmander |
| 4,894,662 A | 1/1990 | Counselman |
| 5,045,861 A | 9/1991 | Duffett-Smith |
| 5,157,686 A | 10/1992 | Omura et al. |
| 5,166,952 A | 11/1992 | Omura et al. |
| 5,226,036 A * | 7/1993 | Riley et al. ............ 370/249 |
| 5,271,034 A | 12/1993 | Abaunza |
| 5,323,322 A | 6/1994 | Mueller et al. |
| 5,398,034 A | 3/1995 | Spilker, Jr. |
| 5,481,316 A | 1/1996 | Patel |
| 5,504,492 A | 4/1996 | Class et al. |
| 5,510,801 A | 4/1996 | Engelbrecht et al. |
| 5,604,765 A | 2/1997 | Bruno et al. |
| 5,630,206 A | 5/1997 | Urban et al. |
| 5,648,982 A | 7/1997 | Durrant et al. |
| 5,774,829 A | 6/1998 | Cisneros et al. |
| 5,784,339 A | 7/1998 | Woodsum et al. |
| 5,835,060 A | 11/1998 | Czarnecki et al. |

(Continued)

FOREIGN PATENT DOCUMENTS

DE 3242997 A1 5/1984

(Continued)

OTHER PUBLICATIONS

U.S. Appl. No. 12/209,971, filed Sep. 12, 2008, Do, et al.

(Continued)

*Primary Examiner* — Dao Phan
(74) *Attorney, Agent, or Firm* — Woodcock Washburn LLP (57) ABSTRACT

Apparatus having corresponding methods and computer-readable media comprise a first receiver to receive a wireless television signal; a first measurement unit to generate a measurement of the wireless television signal; wherein a position of the apparatus is determined based on the measurement of the wireless television signal; a second receiver to receive a wireless local area network (WLAN) signal; and a second measurement unit to generate a measurement of the WLAN signal; wherein a position of a transmitter of the WLAN signal is determined based on the position of the apparatus and the measurement of the WLAN signal.

50 Claims, 6 Drawing Sheets

U.S. PATENT DOCUMENTS

| | | | |
|---|---|---|---|
| 5,887,243 A * | 3/1999 | Harvey et al. ............ 725/136 | |
| 5,920,284 A | 7/1999 | Victor | |
| 5,952,958 A | 9/1999 | Speasl et al. | |
| 5,953,311 A | 9/1999 | Davies et al. | |
| 6,006,097 A | 12/1999 | Hornfeldt et al. | |
| 6,016,119 A | 1/2000 | Krasner | |
| 6,069,663 A * | 5/2000 | Bessel et al. ............ 348/446 | |
| 6,078,284 A | 6/2000 | Levanon | |
| 6,094,168 A | 7/2000 | Duffett-Smith et al. | |
| 6,107,959 A | 8/2000 | Levanon | |
| 6,137,441 A | 10/2000 | Dai et al. | |
| 6,144,413 A | 11/2000 | Zatsman | |
| 6,147,642 A | 11/2000 | Perry et al. | |
| 6,181,921 B1 | 1/2001 | Konisi et al. | |
| 6,184,921 B1 | 2/2001 | Limberg | |
| 6,201,497 B1 | 3/2001 | Snyder et al. | |
| 6,215,778 B1 | 4/2001 | Lomp et al. | |
| 6,289,280 B1 | 9/2001 | Fernandez-Corbaton et al. | |
| 6,317,452 B1 | 11/2001 | Durrant et al. | |
| 6,317,500 B1 | 11/2001 | Murphy | |
| 6,373,432 B1 | 4/2002 | Rabinowitz et al. | |
| 6,374,177 B1 | 4/2002 | Lee et al. | |
| 6,400,753 B1 | 6/2002 | Kohli et al. | |
| 6,433,740 B1 | 8/2002 | Gilhousen | |
| 6,437,832 B1 | 8/2002 | Grabb et al. | |
| 6,484,034 B1 | 11/2002 | Tsunehara et al. | |
| 6,504,578 B1 * | 1/2003 | Gu ............ 348/521 | |
| 6,522,297 B1 | 2/2003 | Rabinowitz et al. | |
| 6,559,800 B2 | 5/2003 | Rabinowitz et al. | |
| 6,559,894 B2 | 5/2003 | Omura et al. | |
| 6,590,529 B2 | 7/2003 | Schwoegler | |
| 6,646,603 B2 | 11/2003 | Dooley et al. | |
| 6,717,547 B2 | 4/2004 | Spilker, Jr. et al. | |
| 6,727,847 B2 | 4/2004 | Rabinowitz et al. | |
| 6,753,812 B2 | 6/2004 | Rabinowitz et al. | |
| 6,806,830 B2 | 10/2004 | Panasik et al. | |
| 6,839,024 B2 | 1/2005 | Spilker, Jr. et al. | |
| 6,859,173 B2 | 2/2005 | Spilker, Jr. et al. | |
| 6,861,984 B2 | 3/2005 | Rabinowitz et al. | |
| 6,879,286 B2 | 4/2005 | Rabinowitz et al. | |
| 6,914,560 B2 | 7/2005 | Spilker, Jr. et al. | |
| 6,917,328 B2 | 7/2005 | Rabinowitz et al. | |
| 6,937,866 B2 | 8/2005 | Duffett-Smith et al. | |
| 6,952,182 B2 | 10/2005 | Spilker, Jr. et al. | |
| 6,961,020 B2 | 11/2005 | Robinowitz et al. | |
| 6,963,306 B2 | 11/2005 | Spilker, Jr. et al. | |
| 6,970,132 B2 | 11/2005 | Spilker, Jr. et al. | |
| 7,042,396 B2 | 5/2006 | Omura et al. | |
| 7,042,949 B1 | 5/2006 | Omura et al. | |
| 7,126,536 B2 | 10/2006 | Rabinowitz et al. | |
| 7,260,378 B2 | 8/2007 | Holland et al. | |
| 7,269,424 B2 | 9/2007 | Camp, Jr. | |
| 7,372,405 B2 | 5/2008 | Rabinowitz et al. | |
| 7,463,195 B2 | 12/2008 | Rabinowitz et al. | |
| 2002/0122003 A1 | 9/2002 | Patwari et al. | |
| 2002/0184653 A1 | 12/2002 | Pierce et al. | |
| 2002/0199196 A1 | 12/2002 | Rabinowitz et al. | |
| 2003/0162547 A1 | 8/2003 | McNair | |
| 2004/0073914 A1 | 4/2004 | Spilker et al. | |
| 2004/0201779 A1 | 10/2004 | Spilker et al. | |
| 2005/0066373 A1 | 3/2005 | Rabinowitz | |
| 2005/0251844 A1 | 11/2005 | Martone et al. | |
| 2007/0050824 A1 | 3/2007 | Lee et al. | |
| 2007/0121555 A1 | 5/2007 | Burgess et al. | |
| 2007/0131079 A1 | 6/2007 | Opshaug et al. | |
| 2007/0182633 A1 | 8/2007 | Omura et al. | |
| 2007/0296632 A1 | 12/2007 | Opshaug et al. | |

FOREIGN PATENT DOCUMENTS

| | | |
|---|---|---|
| EP | 58129277 | 8/1983 |
| GB | 2 222 922 A | 3/1990 |
| GB | 2 254 508 A | 10/1992 |

OTHER PUBLICATIONS

U.S. Appl. No. 12/333,445, filed Dec. 12, 2008, Rubin, et al.

U.S. Appl. No. 12/351,841, filed Jan. 11, 2009, Lee, et al.

Parkinson, B.W., et al., "Autonomous GPS Integrity Monitoring Using the Pseudorange Residual," *Journal of the Institute of Navigation* (1988), vol. 35, No. 2, pp. 255-274.

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.

Spilker, Jr., J.J., "Fundamentals of Signal Tracking Theory," *Global Positioning System: Theory and Applications* (1994), vol. 1, Chapter 7, pp. 245-327.

Van Dierendock, A.J., "GPS Receivers," *Global Positioning System: Theory and Applications* (1995), vol. 1, Chapter 8, pp. 329-407.

Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

U.S. Appl. No. 12/263,731, Rabinowitz, et al.

U.S. Appl. No. 10/008,613, Pierce et al.

U.S. Appl. No. 11/380,691, Metzler, et al.

U.S. Appl. no. 11/535,485, Furman, et al.

U.S. Appl. No. 11/770,162, Furman, et al.

U.S. Appl. No. 11/865,881, Opshaug, et al.

U.S. Appl. No. 12/117,676, Rabinowitz, et al.

U.S. Appl. No. 12/168,141, Furman, et al.

U.S. Appl. No. 12/476,992, Do, et al.

\* cited by examiner

POSITION DETERMINATION USING WIRELESS LOCAL AREA NETWORK SIGNALS AND TELEVISION SIGNALS

CROSS-REFERENCE TO RELATED APPLICATIONS

The subject matter of all of the foregoing are incorporated herein by reference.

BACKGROUND

The present invention relates generally to position determination. More particularly, the present invention relates to position determination using wireless local area network (WLAN) signals and television signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry.

SUMMARY

In general, in one aspect, the invention features an apparatus comprising: a first receiver to receive a wireless television signal; a first measurement unit to generate a measurement of the wireless television signal; wherein a position of the apparatus is determined based on the measurement of the wireless television signal; a second receiver to receive a wireless local area network (WLAN) signal; and a second measurement unit to generate a measurement of the WLAN signal; wherein a position of a transmitter of the WLAN signal are determined based on the position of the apparatus and the measurement of the WLAN signal.

In some embodiments, the second receiver is compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the measurement of the WLAN signal includes at least one of: a measurement of the received power level of the WLAN signal; and a media access control (MAC) address of the transmitter of the WLAN signal. Some embodiments comprise a transmitter to transmit a signal representing the measurement of the wireless television signal and the measurement of the WLAN signal. Some embodiments comprise a position unit to determine the position of the apparatus. Some embodiments comprise a transmitter to transmit a signal representing the position of the apparatus and the measurement of the WLAN signal. Some embodiments comprise a WLAN position unit to determine the position of the transmitter of the WLAN signal. Some embodiments comprise a database to store the position of the transmitter of the WLAN signal. Some embodiments comprise a transmitter to transmit a signal representing the position of the transmitter of the WLAN signal. Some embodiments comprise a third receiver to receive a satellite positioning signal; and a third measurement unit to generate a measurement of the satellite positioning signal; wherein the position unit determines the position of the apparatus based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features an apparatus comprising: first receiving means for receiving a wireless television signal; first measuring means for generating a measurement of the wireless television signal; wherein a position of the apparatus is determined based on the measurement of the wireless television signal; second receiving means for receiving a wireless local area network (WLAN) signal; and second measuring means for generating a measurement of the WLAN signal; wherein a position of a transmitter of the WLAN signal are determined based on the position of the apparatus and the measurement of the WLAN signal.

In some embodiments, the second receiving means is compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the measurement of the WLAN signal includes at least one of: a measurement of the received power level of the WLAN signal; and a media access control (MAC) address of the transmitter of the WLAN signal. Some embodiments comprise transmitting means for transmitting a signal representing the measurement of the wireless television signal and the measurement of the WLAN signal. Some embodiments comprise positioning means for determining the position of the apparatus. Some embodiments comprise transmitting means for transmitting a signal representing the position of the apparatus and the measurement of the WLAN signal. Some embodiments comprise means for determining the position of the transmitter of the WLAN signal. Some embodiments comprise means for storing the position of the transmitter of the WLAN signal in a database. Some embodiments comprise transmitting means for transmitting a signal representing the position of the transmitter of the WLAN signal. Some embodiments comprise third receiving means for receiving a satellite positioning signal; and third measuring means for generating a measurement of the satellite positioning signal; wherein the positioning means determines the position of the apparatus based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features a method comprising: receiving a wireless television signal at a receiver; generating a measurement of the wireless television signal; wherein a position of the receiver is determined based on the measurement of the wireless television signal; receiving a wireless local area network (WLAN) signal; and generating a measurement of the WLAN signal; wherein a position of a transmitter of the WLAN signal are determined based on the position of the receiver and the measurement of the WLAN signal.

In some embodiments, the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the measurement of the WLAN signal includes at least one of: a measurement of the received power level of the WLAN signal; and a media access control (MAC) address of the transmitter of the WLAN signal. Some embodiments comprise transmitting a signal representing the measurement of the wireless television signal and the measurement of the WLAN signal. Some embodiments comprise determining the position of the receiver. Some embodiments comprise transmitting a signal representing the position of the receiver and the measurement of the WLAN signal. Some embodiments comprise determining the position of the transmitter of the WLAN signal. Some embodiments comprise storing the position of the transmitter of the WLAN signal in a database. Some embodiments comprise transmitting a signal representing the position of the transmitter of the WLAN signal. Some embodiments comprise receiving a satellite positioning signal; generating a measurement of the satellite positioning signal; and determining the position of the receiver based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features computer-readable media embodying instructions executable by a computer to perform a method comprising: generating a measurement of a wireless television signal received at a receiver; wherein a position of the receiver is determined based on the measurement of the wireless television signal; and generating a measurement of a wireless local area network (WLAN) signal; wherein a position of a transmitter of the WLAN signal are determined based on the position of the receiver and the measurement of the WLAN signal.

In some embodiments, the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w. In some embodiments, the measurement of the WLAN signal includes at least one of: a measurement of the received power level of the WLAN signal; and a media access control (MAC) address of the transmitter of the WLAN signal. Some embodiments comprise causing transmission of a signal representing the measurement of the wireless television signal and the measurement of the WLAN signal. Some embodiments comprise determining the position of the receiver. Some embodiments comprise causing transmission of a signal representing the position of the receiver and the measurement of the WLAN signal. Some embodiments comprise determining the position of the transmitter of the WLAN signal. Some embodiments comprise storing the position of the transmitter of the WLAN signal in a database. Some embodiments comprise causing transmission of a signal representing the position of the transmitter of the WLAN signal. Some embodiments comprise generating a measurement of a satellite positioning signal; and determining the position of the receiver based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features an apparatus comprising: a first receiver to receive a wireless television signal; and a first measurement unit to generate a measurement of the wireless television signal; wherein a position of the apparatus is determined based on the measurement of the wireless television signal; and a transmitter to transmit a wireless local area network (WLAN) signal, wherein the WLAN signal comprises a position signal representing the position of the apparatus.

In some embodiments, the transmitter is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise a position unit to determine the position of the apparatus based on the wireless television signal. Some embodiments comprise a second receiver to receive a satellite positioning signal; and a second measurement unit to generate a measurement of the satellite positioning signal; wherein the position of the apparatus is determined based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features an apparatus comprising: first receiving means for receiving a wireless television signal; and first measuring means for generating a measurement of the wireless television signal; wherein a position of the apparatus is determined based on the measurement of the wireless television signal; and transmitting means for transmitting a wireless local area network (WLAN) signal, wherein the WLAN signal comprises a position signal representing the position of the apparatus.

In some embodiments, the transmitting means is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise positioning means for determining the position of the apparatus based on the wireless television signal. Some embodiments comprise second receiving means for receiving a satellite positioning signal; and second measuring means for generating a measurement of the satellite positioning signal; wherein the position of the apparatus is determined based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features a method comprising: receiving a wireless television signal at a receiver; and generating a measurement of the wireless television signal; wherein a position of the receiver is determined based on the measurement of the wireless television signal; and transmitting a wireless local area network (WLAN) signal, wherein the WLAN signal comprises a position signal representing the position of the receiver.

In some embodiments, the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise determining the position of the receiver based on the wireless television signal. Some embodiments comprise receiving a satellite positioning signal; and generating a measurement of the satellite positioning signal; wherein the position of the receiver is determined based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features computer-readable media embodying instructions executable by a computer to perform a method comprising: generating a measurement of a wireless television signal received at a receiver; wherein a position of the receiver is determined based on the measurement of the wireless television signal; and causing transmission of a wireless local area network (WLAN) signal, wherein the WLAN signal comprises a position signal representing the position of the receiver.

In some embodiments, the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise determining the position of the receiver based on the wireless television signal. Some embodiments comprise generating a measurement of a satellite positioning signal; wherein the position of the receiver is determined based on the measurement of the wireless television signal and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features an apparatus comprising: a first receiver to receive a wireless television signal; a first measurement unit to generate a measurement of the wireless television signal; a second receiver to receive a wireless local area network (WLAN) signal; and a second measurement unit to generate a measurement of the WLAN signal; wherein a position of the apparatus is determined based on the measurement of the wireless television signal and the measurement of the WLAN signal.

In some embodiments, the second receiver is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise a position unit to determine the position of the apparatus based on the measurement of the wireless television signal and the measurement of the WLAN signal. Some embodiments comprise a transmitter to transmit a signal representing the position of the apparatus. Some embodiments comprise a third receiver to receive a satellite positioning signal; and a third measurement unit to generate a measurement of the satellite positioning signal; wherein the position of the apparatus is determined based on the measurement of the wireless television signal, the measurement of the WLAN signal, and the measurement of the satellite positioning signal. Some embodiments comprise a position unit to determine the position of the apparatus based on the measurement of the wireless television signal, the measurement of the WLAN signal, and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features an apparatus comprising: first receiving means for receiving a wireless television signal; first measuring means for generating a measurement of the wireless television signal; second receiving means for receiving a wireless local area network (WLAN) signal; and second measuring means for generating a measurement of the WLAN signal; wherein a position of the apparatus is determined based on the measurement of the wireless television signal and the measurement of the WLAN signal.

In some embodiments, the second receiving means is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise positioning means for determining the position of the apparatus based on the measurement of the wireless television signal and the measurement of the WLAN signal. Some embodiments comprise transmitting means for transmitting a signal representing the position of the apparatus. Some embodiments comprise third receiving means for receiving a satellite positioning signal; and third measuring means for generating a measurement of the satellite positioning signal; wherein the position of the apparatus is determined based on the measurement of the wireless television signal, the measurement of the WLAN signal, and the measurement of the satellite positioning signal. Some embodiments comprise positioning means for determining the position of the apparatus based on the measurement of the wireless television signal, the measurement of the WLAN signal, and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features a method comprising: receiving a wireless television signal at a receiver; generating a measurement of the wireless television signal; receiving a wireless local area network (WLAN) signal; and generating a measurement of the WLAN signal; wherein a position of the receiver is determined based on the measurement of the wireless television signal and the measurement of the WLAN signal.

In some embodiments, the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise a position unit to determine the position of the receiver based on the measurement of the wireless television signal and the measurement of the WLAN signal. Some embodiments comprise a transmitter to transmit a signal representing the position of the receiver. Some embodiments comprise receiving a satellite positioning signal; and generating a measurement of the satellite positioning signal; wherein the position of the receiver is determined based on the measurement of the wireless television signal, the measurement of the WLAN signal, and the measurement of the satellite positioning signal. Some embodiments comprise determining the position of the receiver based on the measurement of the wireless television signal, the measurement of the WLAN signal, and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

In general, in one aspect, the invention features computer-readable media embodying instructions executable by a computer to perform a method comprising: generating a measurement of a wireless television signal received at a receiver; and generating a measurement of a wireless local area network (WLAN) signal; wherein a position of the receiver is determined based on the measurement of the wireless television signal and the measurement of the WLAN signal.

In some embodiments, the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w. Some embodiments comprise determining the position of the receiver based on the measurement of the wireless television signal and the measurement of the WLAN signal. Some embodiments comprise causing transmission of a signal representing the position of the receiver. Some embodiments comprise generating a measurement of a satellite positioning signal; wherein the position of the receiver is determined based on the measurement of the wireless television signal, the measurement of the WLAN signal, and the measurement of the satellite positioning signal. Some embodiments comprise determining the position of the receiver based on the measurement of the wireless television signal, the measurement of the WLAN signal, and the measurement of the satellite positioning signal. In some embodiments, the wireless television signal comprises at least one of: an American Television Standards Committee (ATSC) digital television (DTV) signal; a Digital Video Broadcasting-Terrestrial (DVB-T) signal; a Digital Video Broadcasting-Handheld (DVB-H) signal; an Integrated Services Digital Broadcasting-Terrestrial (ISDB-T) signal; and a National Television System Committee (NTSC) analog television signal.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present invention provide techniques for position determination using wireless local area network (WLAN) signals and wireless television signals. Broadcast television signals can be used to determine the position of a user terminal. Techniques for determining the position of a user terminal using the American Television Standards Committee (ATSC) digital television (DTV) signal are disclosed in U.S. Pat. No. 6,861,984, "Position Location using Broadcast Digital Television Signals," the disclosure thereof incorporated by reference herein in its entirety. Techniques for determining the position of a user terminal using the European Telecommunications Standards Institute (ETSI) Digital Video Broadcasting (DVB) signal are disclosed in U.S. Nonprovisional patent application Ser. No. 09/932,010, "Wireless Position Location Using the Japanese ISDB-T Digital TV Signals," the disclosure thereof incorporated by reference herein in its entirety. Techniques for determining the position of a user terminal using the Japanese Integrated Services Digital Broadcasting-Terrestrial (ISDB-T) signal are disclosed in U.S. Pat. No. 6,952,182, "Position Location using Terrestrial Digital Video Broadcast Television Signals," the disclosure thereof incorporated by reference herein in its entirety. Techniques for determining the position of a user terminal using the NTSC (National Television System Committee) analog television (TV) signal are disclosed in U.S.

Pat. No. 6,559,800 and U.S. Pat. No. 6,522,297, the disclosures thereof incorporated by reference herein in their entirety.

Each of these television signals includes components that can be used to obtain a pseudo-range to the transmitter of the television signal. When multiple such pseudo-ranges are known, and the locations of the transmitters are known, the position of the user terminal can be determined with accuracy. Suitable components within the ATSC digital television signal include synchronization codes such as the Field Synchronization Segment within an ATSC data frame and the Synchronization Segment within a Data Segment within an ATSC data frame. Suitable components within the ETSI DVB and ISDB-T digital television signals include scattered pilot carriers. Suitable components within the NTSC analog television signal include the horizontal synchronization pulse, the horizontal blanking pulse, the horizontal blanking pulse and horizontal synchronization pulse taken together, the ghost canceling reference signal, the vertical interval test signal, and other chirp-type signals.

Positioning techniques using television signals should revolutionize the technology of navigation and position location. The ubiquitous availability of television signals allows for coverage anywhere that television is available. In fact, with the use of time-gated delay-lock loops, it is possible to use television signals for positioning even beyond those areas where television reception is available. Details are provided in, for example, U.S. Pat. No. 6,753,812, "Time-Gated Non-coherent Delay Lock Loop Tracking of Digital Television Signals," the disclosure thereof incorporated by reference herein in its entirety.

In some cases it is desirable to augment the television signals with other sorts of signals for more accurate positioning. For example, one or more GPS signals can be used. Techniques for determining the position of a user terminal using television and GPS signals are described in U.S. patent application Ser. No. 10/159,478, "Position Location using Global Positioning Signals Augmented by Broadcast Television Signals," filed May 31, 2002, the disclosure thereof incorporated by reference herein in its entirety.

Another wireless signal that can be used to augment television signals for positioning is the wireless local area network (WLAN) signal, also referred to as "WiFi," which is specified by IEEE standard 802.11. WLAN signals are especially useful in urban centers where WLAN nodes exist in high density. However, it is necessary to survey the locations of the WLAN nodes in order to maintain an accurate database of the location of all WLAN nodes. One conventional way to survey WLAN node locations is using a GPS-located WLAN receiver. But GPS is most affected by blockage in those environments where WLAN nodes are most prevalent. This weakness results in a very unreliable positioning system.

Some embodiments of the present invention provide techniques for surveying WLAN nodes using wireless television signals by remotely sensing the WLAN nodes. According to these embodiments, one or more wireless television signals are used to determine the position of a portable survey unit, which can be implemented as a laptop computer or the like. In some embodiments, the wireless television signals can be augmented by other signals, such as GPS signals. The survey unit receives and measures one or more WLAN signals. For example, the survey unit can measure the received power level of each WLAN signal, and the media access control (MAC) address of the WLAN node transmitting each WLAN signal. The position of the survey unit and the measurements of each WLAN signal are used to determine the position of the transmitter of the WLAN signal (that is, the WLAN node). In some embodiments, the survey unit determines the positions of the WLAN nodes. In other embodiments, the survey unit transmits the measurements to a WLAN position unit, which determines the positions of the WLAN nodes. Once the position and identity of the WLAN node are known, WLAN signals transmitted by the WLAN node can be used for positioning.

Some embodiments of the present invention provide techniques for surveying WLAN nodes using wireless television signals by equipping each WLAN node with a television position unit. According to these embodiments, one or more wireless television signals are used to determine the position of the WLAN node. In some embodiments, the wireless television signals can be augmented by other signals, such as GPS signals. The WLAN node then transmits a WLAN signal that includes a position signal representing the position of a WLAN node. The WLAN signals transmitted by the WLAN node can be used for positioning.

Some embodiments of the present invention provide techniques for determining the position of an apparatus using WLAN signals and wireless television signals. According to these embodiments, an apparatus receives one or more WLAN signals and one or more wireless television signals. The position of the apparatus is then determined based on the wireless television signals and WLAN signals. In some embodiments, the television signals can be augmented by other signals, such as GPS signals. In some embodiments, the apparatus determines its position. In other embodiments, the apparatus transmits measurements of the wireless television signals and WLAN signals to a remote position unit, which determines the positions of the apparatus.

Figure 1:
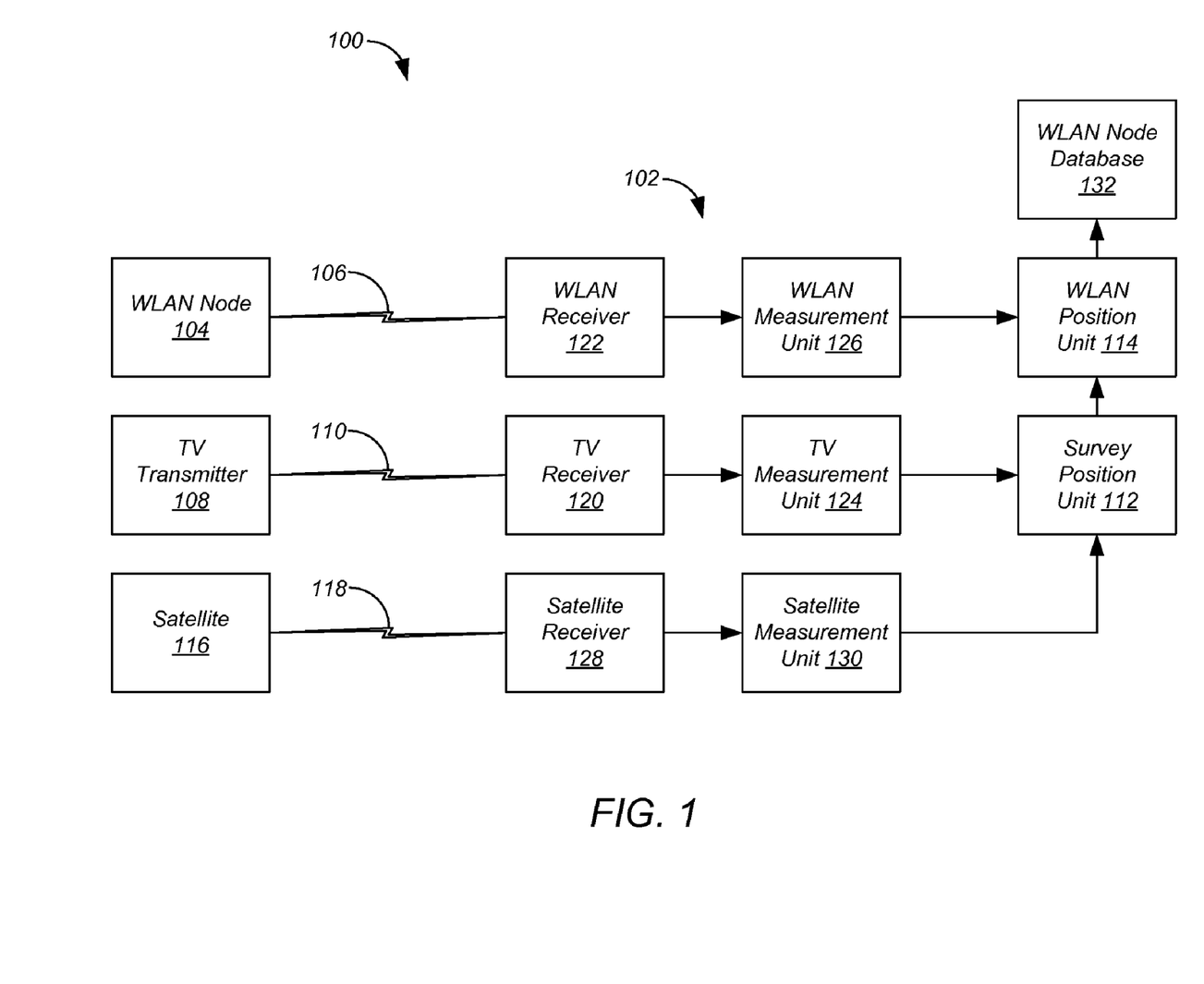
FIG. 1 shows a system for surveying WLAN nodes using wireless television signals by remotely sensing the WLAN nodes according to some embodiments of the present invention.

FIG. 1 shows a system 100 for surveying WLAN nodes using wireless television signals by remotely sensing the WLAN nodes according to some embodiments of the present invention. Although in the described embodiments, the elements of system 100 are presented in one arrangement, other embodiments may feature other arrangements, as will be apparent to one skilled in the relevant arts based on the disclosure provided herein.

System 100 comprises a survey unit 102, one or more WLAN nodes 104 to transmit WLAN signals 106, one or more television transmitters 108 to transmit wireless television signals 110, a survey position unit 112, and a WLAN position unit 114. System 100 can also comprise one or more positioning satellites 116, such as GPS satellites and the like, to transmit satellite positioning signals 118.

Survey unit 102 comprises a television receiver 120 to receive one or more wireless television signals 110 from television transmitter(s) 108, and a television measurement unit 124 to generate one or more measurements of each television signal 110. Survey unit 102 also comprises a WLAN receiver 122 to receive WLAN signal(s) 106 from WLAN node(s) 104, and a WLAN measurement unit 126 to generate one or more measurements of each WLAN signal 106. In some embodiments, WLAN receiver 122 is compliant with all or part of IEEE standard 802.11, including draft and approved amendments such as 802.11a, 802.11b, 802.11e, 802.11g, 802.11i, 802.11k, 802.11n, 802.11v, and 802.11w. In some embodiments, survey unit 102 comprises a satellite receiver 128 to receive one or more satellite positioning signals 118 from satellite(s) 116, and a satellite measurement unit 130 to generate one or more measurements of each satellite positioning signal 118.

Survey position unit 112 determines the position of survey unit 102 based on wireless television signal(s) 110. In some embodiments, survey position unit 112 also employs other sorts of signals, such as satellite positioning signals 118, FM signals, and the like, to determine the position of survey unit 102. In some embodiments, survey position unit 112 is implemented as part of survey unit 102. In other embodiments, survey position unit 112 is implemented separately. For example, survey position unit 112 can be implemented remotely, and can communicate with survey unit 102 over a wireless link.

WLAN position unit 114 determines the position of each WLAN node 104 based on the position of survey unit 102 and the measurements of the respective WLAN signal 106. In some embodiments, WLAN position unit 114 is implemented as part of survey unit 102. In other embodiments, WLAN position unit 114 is implemented separately. For example, WLAN position unit 114 can be implemented remotely, and can communicate with survey unit 102 over a wireless link. In some embodiments, the positions of WLAN nodes 104 are recorded in a WLAN node database 132.

Figure 2:
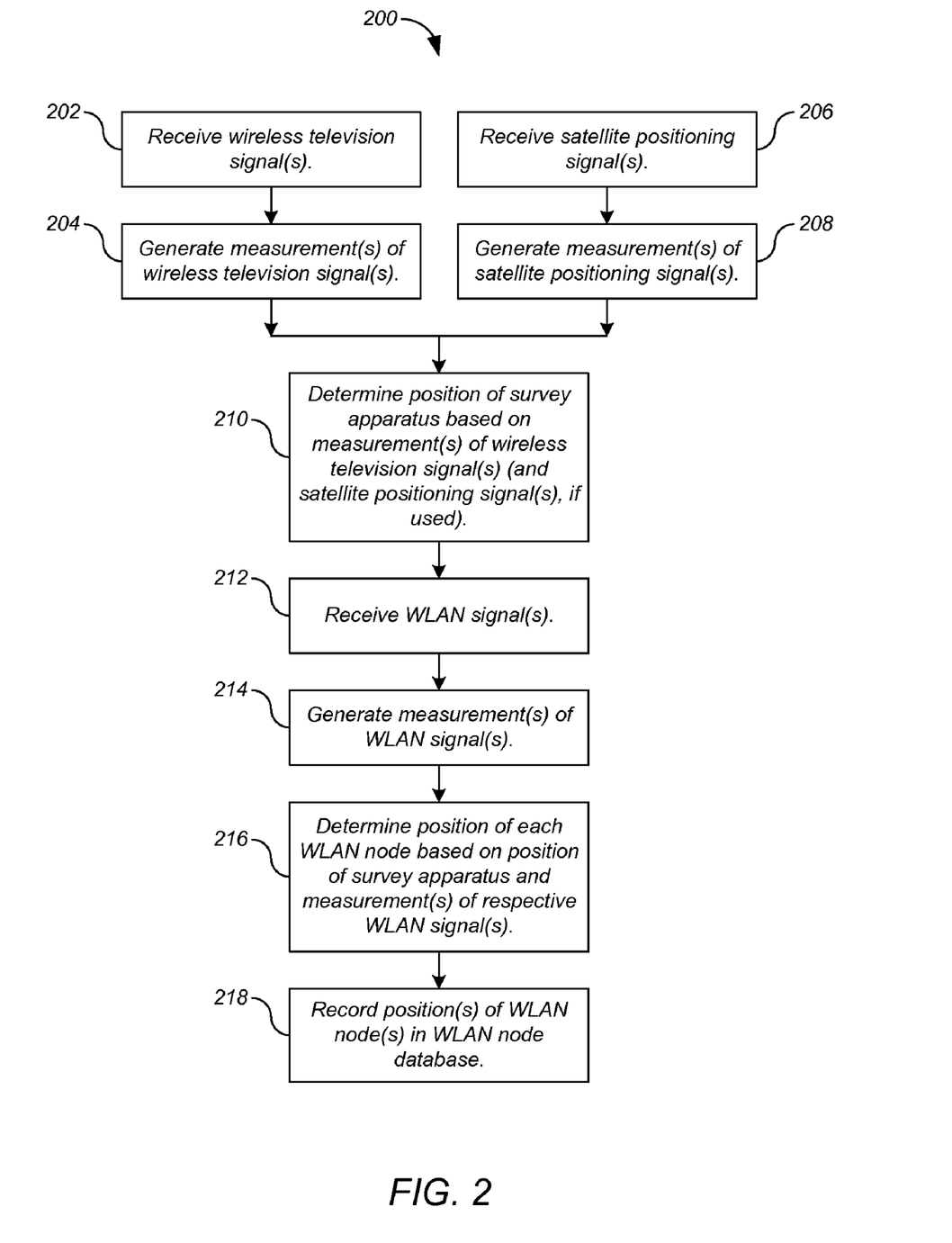
FIG. 2 shows a process for the system of FIG. 1 according to some embodiments of the present invention.

FIG. 2 shows a process 200 for system 100 of FIG. 1 according to some embodiments of the present invention. Although in the described embodiments, the elements of process 200 are presented in one arrangement, other embodiments may feature other arrangements, as will be apparent to one skilled in the relevant arts based on the disclosure provided herein.

Television receiver 120 of survey unit 102 receives one or more wireless television signals 110 from television transmitter(s) 108 (step 202). For example, wireless television signals 110 can comprise analog television signals such as the NTSC analog television signal, digital television signals such as the ATSC, DVB-T, DVB-H, ISDB-T signals, and the like.

Television measurement unit 124 generates one or more measurements of each wireless television signal 110 (step 204). Techniques for generating measurements of television signals that are useful for positioning are described in detail in the patent documents cited above. For example, television measurement unit 124 generates a pseudorange for each wireless television signal 110.

In embodiments employing satellites 116, satellite receiver 128 receives one or more satellite positioning signals 118 from satellite(s) 116 (step 206), and satellite measurement unit 130 generates one or more measurements of each satellite positioning signal 118 (step 208). For example, satellite measurement unit 130 generates a pseudorange for each satellite positioning signal 118.

Survey position unit 112 determines the position of survey unit 102 based on the measurement(s) of wireless television signal(s) 110, and if used, the measurement(s) of satellite positioning signal(s) 118 (step 210). Techniques for determining positions based on measurements of television signals, and satellite positioning signals, are described in detail in the patent documents cited above.

WLAN receiver 122 of survey unit 102 receives one or more WLAN signals 106 from each WLAN node 104 (step 212). In some embodiments, WLAN signals 106 are compliant with all or part of IEEE standard 802.11, including draft and approved amendments such as 802.11a, 802.11b, 802.11e, 802.11g, 802.11i, 802.11k, 802.11n, 802.11v, and 802.11w.

WLAN measurement unit 126 generates one or more measurements of each WLAN signal 106 (step 214). For example, the measurements can include a measurement of the received power level of each WLAN signal 106 and the like. In order to identify each WLAN node 104, WLAN measurement unit 126 can also determine the media access control (MAC) address of each WLAN node 104.

WLAN position unit 114 determines the position of each WLAN node 104 based on the position of survey unit 102 and the measurement(s) of the respective WLAN signal 106 (step 216). In some embodiments, the positions of WLAN nodes 104 are recorded in WLAN node database 132 (step 218).

Once the positions of WLAN nodes 104 are established, many techniques exist to use the WLAN nodes 104 for positioning. One approach is to associate each WLAN node 104, for example by the MAC address of the WLAN node 104, with a particular radius of detection, and to assume that when survey unit 102 lies within that radius, its WLAN receiver 122 can detect the MAC address. Another approach is to perform a ranging measurement to each WLAN node 304 based on the measured power level of the WLAN signal 106 transmitted by that WLAN node 304. However, embodiments of the present invention are not limited to these techniques.

Figure 3:
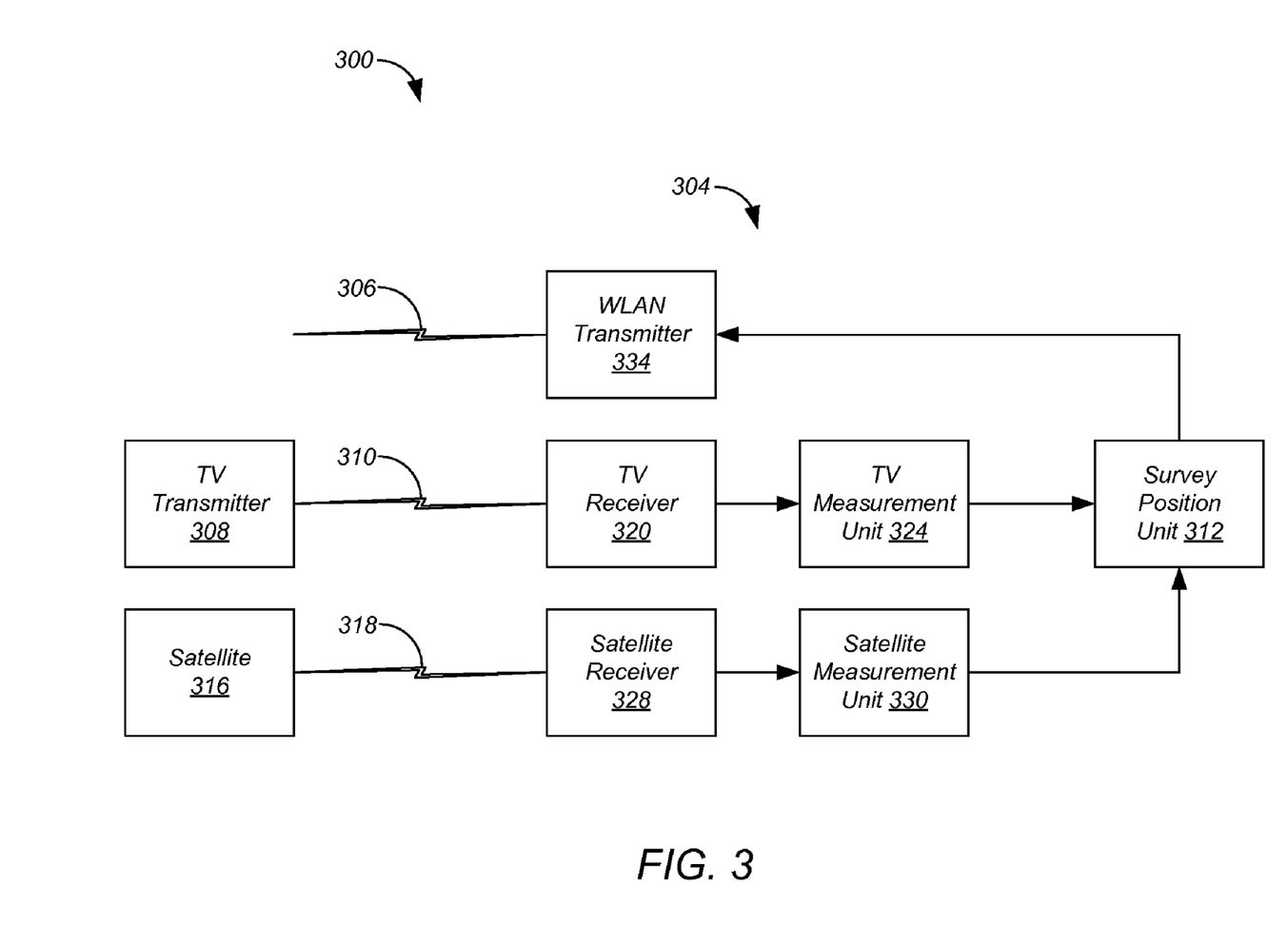
FIG. 3 shows a system for surveying WLAN nodes using wireless television signals by equipping each WLAN node with a television position unit according to some embodiments of the present invention.

FIG. 3 shows a system 300 for surveying WLAN nodes using wireless television signals by equipping each WLAN node with a television position unit according to some embodiments of the present invention. Although in the described embodiments, the elements of system 300 are presented in one arrangement, other embodiments may feature other arrangements, as will be apparent to one skilled in the relevant arts based on the disclosure provided herein.

System 300 comprises a WLAN node 304 to transmit WLAN signals 306, one or more television transmitters 308 to transmit wireless television signals 310, and a survey position unit 312. System 300 can also comprise one or more positioning satellites 316, such as GPS satellites and the like, to transmit satellite positioning signals 318.

WLAN node 304 comprises a television receiver 320 to receive one or more wireless television signals 310 from television transmitter(s) 308, and a television measurement unit 324 to generate one or more measurements of each wireless television signal 310. WLAN node 304 also comprises a WLAN transmitter 334 to transmit WLAN signal(s) 306. In some embodiments, WLAN transmitter 334 is compliant with all or part of IEEE standard 802.11, including draft and approved amendments such as 802.11a, 802.11b, 802.11e, 802.11g, 802.11i, 802.11k, 802.11n, 802.11v, and 802.11w. In some embodiments, WLAN node 304 comprises a satellite receiver 328 to receive one or more satellite positioning signals 318 from satellite(s) 316, and a satellite measurement unit 330 to generate one or more measurements of each satellite positioning signal 318.

Survey position unit 312 determines the position of WLAN node 304 based on wireless television signal(s) 310. In some embodiments, survey position unit 320 also employs other sorts of signals, such as satellite positioning signals 318, FM signals, and the like, to determine the position of WLAN node 304. In some embodiments, survey position unit 312 is implemented as part of WLAN node 304. In other embodiments, survey position unit 312 is implemented separately. For example, survey position unit 312 can be implemented remotely, and can communicate with WLAN node 304 over a wireless link. When the position of WLAN node 304 has been determined, WLAN transmitter 334 transmits a WLAN signal 306 comprising a position signal representing the position of WLAN node 304.

Figure 4:
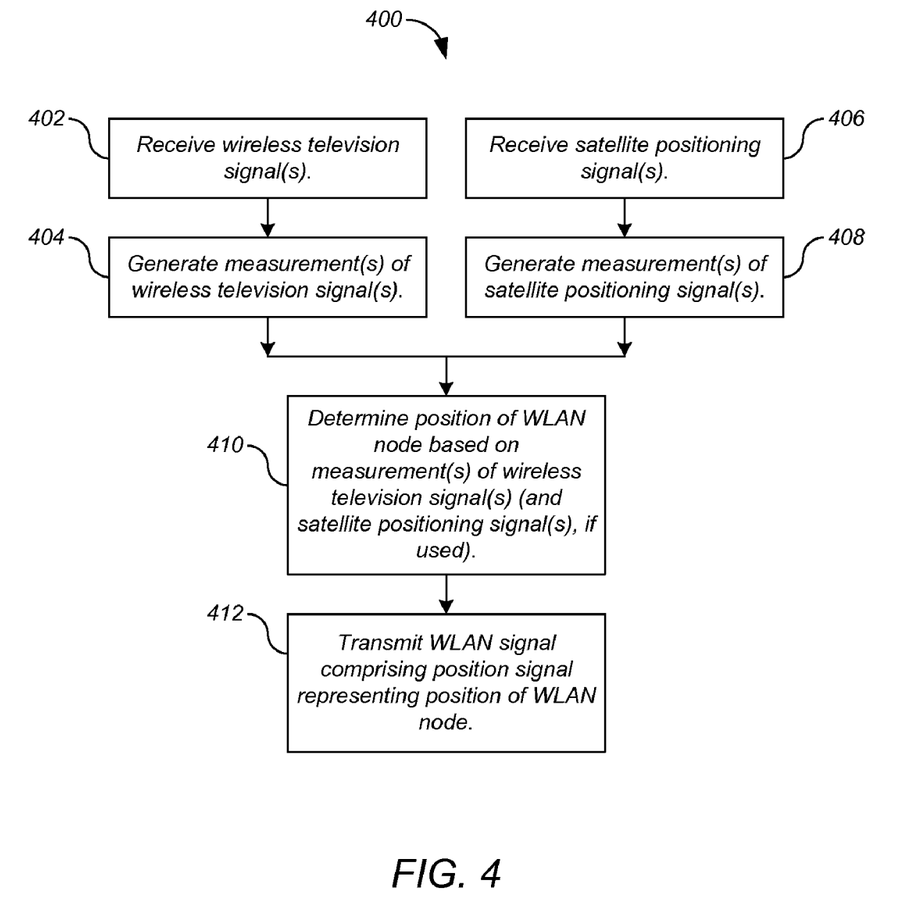
FIG. 4 shows a process for the system of FIG. 3 according to some embodiments of the present invention.

FIG. 4 shows a process 400 for system 300 of FIG. 3 according to some embodiments of the present invention. Although in the described embodiments, the elements of process 400 are presented in one arrangement, other embodiments may feature other arrangements, as will be apparent to one skilled in the relevant arts based on the disclosure provided herein.

Television receiver 320 of WLAN node 304 receives one or more wireless television signals 310 from television transmitter(s) 308 (step 402). For example, wireless television signals 310 can comprise analog television signals such as the NTSC analog television signal, digital television signals such as the ATSC, DVB-T, DVB-H, ISDB-T signals, and the like.

Television measurement unit 324 generates one or more measurements of each wireless television signal 310 (step 404). Techniques for generating measurement of television signals that are useful for positioning are described in detail in the patent documents cited above. For example, television measurement unit 324 generates a pseudorange for each wireless television signal 310.

In embodiments employing satellites 316, satellite receiver 328 receives one or more satellite positioning signals 318 from satellite(s) 316 (step 406), and satellite measurement unit 330 generates one or more measurements of each satellite positioning signal 318 (step 408). For example, satellite measurement unit 330 generates a pseudorange for each satellite positioning signal 318.

Survey position unit 312 determines the position of WLAN node 304 based on the measurement(s) of wireless television signal(s) 310, and if used, the measurement(s) of satellite positioning signal(s) 318 (step 410). Techniques for determining positions based on measurements of television signals, and satellite positioning signals, are described in detail in the patent documents cited above. In addition, other signals can be used to augment wireless television signal(s) 310, such as FM signals and the like.

WLAN transmitter 334 of WLAN node 304 transmits one or more WLAN signals 306 (step 412), where WLAN signal 306 comprises a position signal representing the position of WLAN node 304. In some embodiments, WLAN signals 306 are compliant with all or part of IEEE standard 802.11, including draft and approved amendments such as 802.11a, 802.11b, 802.11e, 802.11g, 802.11i, 802.11k, 802.11n, 802.11v, and 802.11w.

Figure 5:
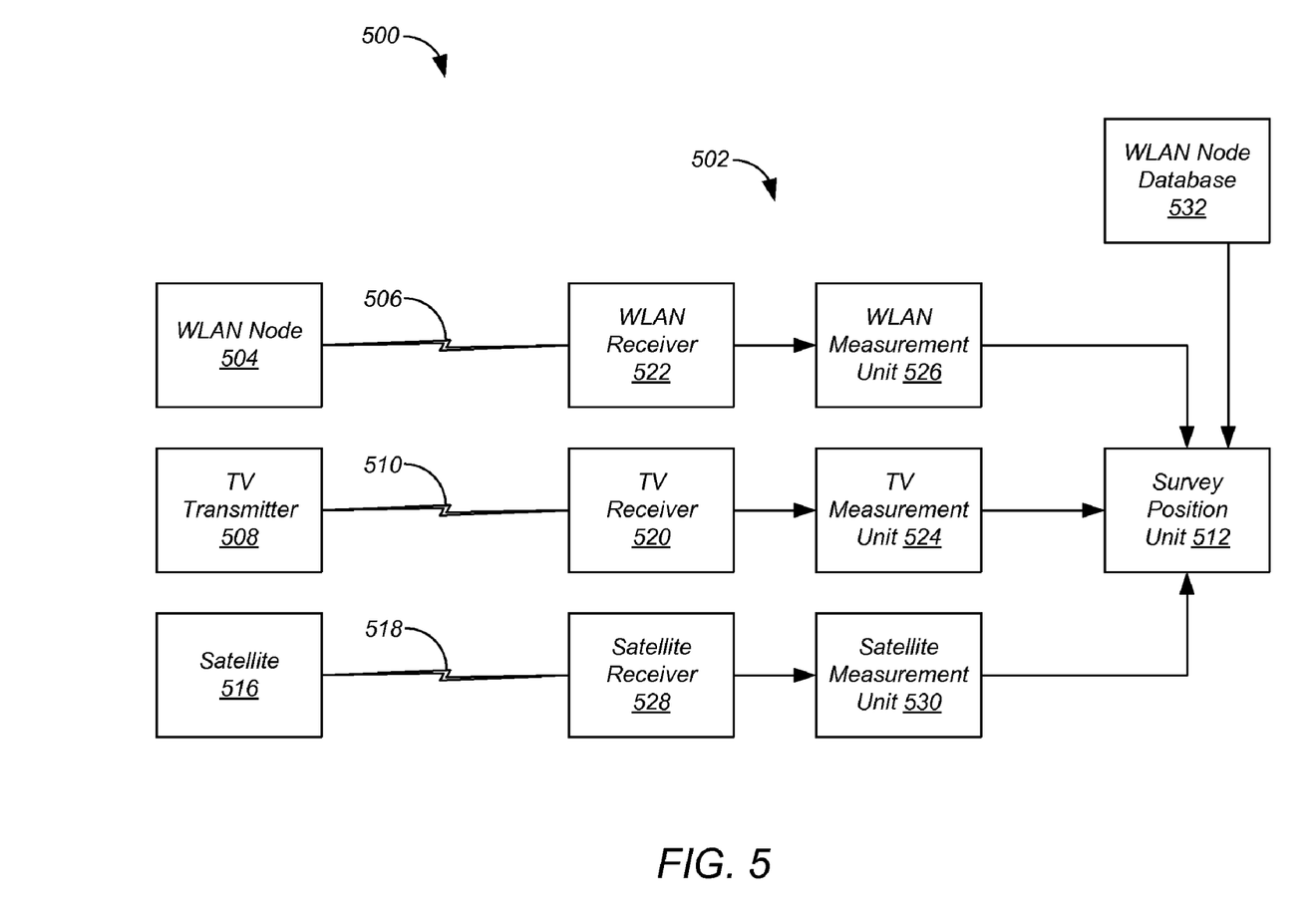
FIG. 5 shows a system for determining the position of an apparatus using WLAN signals and wireless television signals according to some embodiments of the present invention.

FIG. 5 shows a system 500 for determining the position of an apparatus using WLAN signals and wireless television signals according to some embodiments of the present invention. Although in the described embodiments, the elements of system 500 are presented in one arrangement, other embodiments may feature other arrangements, as will be apparent to one skilled in the relevant arts based on the disclosure provided herein.

System 500 comprises a survey unit 502, one or more WLAN nodes 504 to transmit WLAN signals 506, one or more television transmitters 508 to transmit wireless television signals 510, and a survey position unit 512. System 500 can also comprise one or more positioning satellites 516, such as GPS satellites and the like, to transmit satellite positioning signals 518.

Survey unit 502 comprises a television receiver 520 to receive one or more wireless television signals 510 from television transmitter(s) 508, and a television measurement unit 524 to generate one or more measurements of each television signal 510. Survey unit 502 also comprises a WLAN receiver 522 to receive WLAN signal(s) 506 from WLAN node(s) 504, and a WLAN measurement unit 526 to generate one or more measurements of each WLAN signal 506. In some embodiments, WLAN receiver 522 is compliant with all or part of IEEE standard 802.11, including draft and approved amendments such as 802.11a, 802.11b, 802.11e, 802.11g, 802.11i, 802.11k, 802.11n, 802.11v, and 802.11w. In some embodiments, survey unit 502 comprises a satellite receiver 528 to receive one or more satellite positioning signals 518 from satellite(s) 516, and a satellite measurement unit 530 to generate one or more measurements of each satellite positioning signal 518.

Survey position unit 512 determines the position of survey unit 502 based on the measurement(s) of wireless television signal(s) 510 and the measurement(s) of WLAN signals 506. For example, survey position unit 512 can use a WLAN database 532 that contains the positions and identities of WLAN nodes 504.

In some embodiments, survey position unit 512 also employs other sorts of signals, such as satellite positioning signals 518, FM signals, and the like, to determine the position of survey unit 502. In some embodiments, survey position unit 512 is implemented as part of survey unit 502. In other embodiments, survey position unit 512 is implemented separately. For example, survey position unit 512 can be implemented remotely, and can communicate with survey unit 502 over a wireless link.

Figure 6:
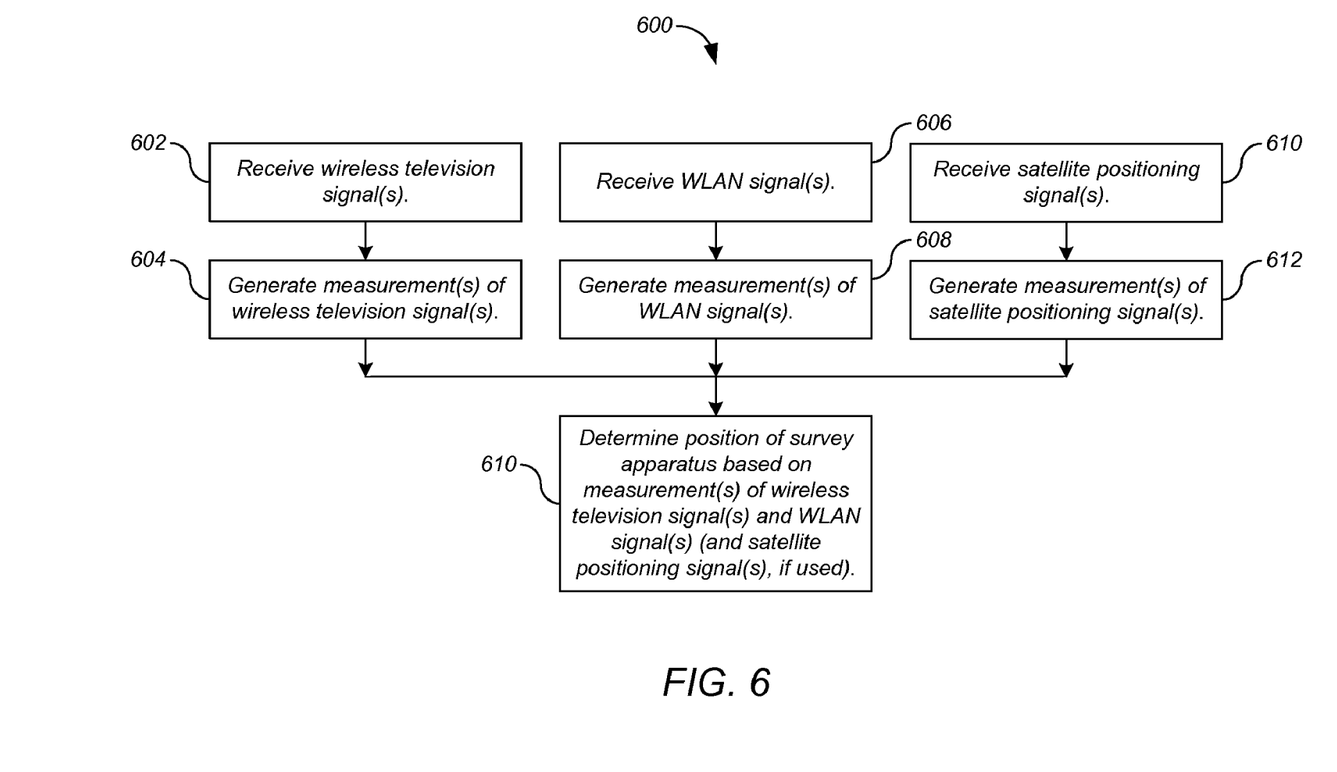
FIG. 6 shows a process for the system of FIG. 5 according to some embodiments of the present invention.

FIG. 6 shows a process 600 for system 500 of FIG. 5 according to some embodiments of the present invention. Although in the described embodiments, the elements of process 600 are presented in one arrangement, other embodiments may feature other arrangements, as will be apparent to one skilled in the relevant arts based on the disclosure provided herein.

Television receiver 520 of survey unit 502 receives one or more wireless television signals 510 from television transmitter(s) 508 (step 602). For example, wireless television signals 510 can comprise analog television signals such as the NTSC analog television signal, digital television signals such as the ATSC, DVB-T, DVB-H, ISDB-T signals, and the like.

Television measurement unit 524 generates one or more measurements of each wireless television signal 510 (step 604). Techniques for generating measurements of television signals that are useful for positioning are described in detail in the patent documents cited above. For example, television measurement unit 524 generates a pseudorange for each wireless television signal 510.

WLAN receiver 522 of survey unit 502 receives one or more WLAN signals 506 from each WLAN node 504 (step 606). In some embodiments, WLAN signals 506 are compliant with all or part of IEEE standard 802.11, including draft and approved amendments such as 802.11a, 802.11b, 802.11e, 802.11g, 802.11i, 802.11k, 802.11n, 802.11v, and 802.11w.

WLAN measurement unit 526 generates one or more measurements of each WLAN signal 506 (step 608). For example, the measurements can include a measurement of the received power level of each WLAN signal 506 and the like. In order to identify each WLAN node 504, WLAN measurement unit 526 can also determine the media access control (MAC) address of each WLAN node 504.

In embodiments employing satellites 516, satellite receiver 528 receives one or more satellite positioning signals 518 from satellite(s) 516 (step 610), and satellite measurement unit 530 generates one or more measurements of each satellite positioning signal 518 (step 612). For example, satellite measurement unit 530 generates a pseudorange for each satellite positioning signal 518.

Survey position unit 512 determines the position of survey unit 502 based on the measurement(s) of wireless television signal(s) 510, the measurement(s) of WLAN signal(s) 506, and if used, the measurement(s) of satellite positioning signal(s) 518 (step 614). Techniques for determining positions based on measurements of television signals, and satellite positioning signals, are described in detail in the patent documents cited above.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a first receiver to receive a wireless television signal;
a first measurement unit to generate a measurement of the wireless television signal;
wherein a position of the apparatus is determined based on the measurement of the wireless television signal;
a second receiver to receive a wireless local area network (WLAN) signal; and
a second measurement unit to generate a measurement of the WLAN signal;
wherein a position of a transmitter of the WLAN signal is determined based on the position of the apparatus and the measurement of the WLAN signal.

2. The apparatus of claim 1, wherein the second receiver is compliant with all or part of IEEE standard 802.11, including draft and approved amendments 802.11a, 802.11b, 802.11e, 802.11g, 802.11i, 802.11k, 802.11n, 802.11v, and 802.11w.

3. The apparatus of claim 2, wherein the measurement of the WLAN signal includes at least one of:
a measurement of the received power level of the WLAN signal; and
a media access control (MAC) address of the transmitter of the WLAN signal.

4. The apparatus of claim 2, further comprising:
a transmitter to transmit a signal representing the measurement of the wireless television signal and the measurement of the WLAN signal.

5. The apparatus of claim 2, further comprising:
a position unit to determine the position of the apparatus.

6. The apparatus of claim 5, further comprising:
a transmitter to transmit a signal representing the position of the apparatus and the measurement of the WLAN signal.

7. The apparatus of claim 2, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

8. An apparatus comprising:
first receiving means for receiving a wireless television signal;
first measuring means for generating a measurement of the wireless television signal;
wherein a position of the apparatus is determined based on the measurement of the wireless television signal;
second receiving means for receiving a wireless local area network (WLAN) signal; and
second measuring means for generating a measurement of the WLAN signal;
wherein a position of a transmitter of the WLAN signal is determined based on the position of the apparatus and the measurement of the WLAN signal.

9. The apparatus of claim 8, wherein the second receiving means is compliant with all or part of IEEE standard 802.11, including draft and approved amendments 802.11a, 802.11b, 802.11e, 802.11g, 802.11i, 802.11k, 802.11n, 802.11v, and 802.11w.

10. The apparatus of claim 9, wherein the measurement of the WLAN signal includes at least one of:
a measurement of the received power level of the WLAN signal; and
a media access control (MAC) address of the transmitter of the WLAN signal.

11. The apparatus of claim 9, further comprising:
transmitting means for transmitting a signal representing the measurement of the wireless television signal and the measurement of the WLAN signal.

12. The apparatus of claim 9, further comprising:
positioning means for determining the position of the apparatus.

13. The apparatus of claim 9, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

14. A method comprising:
receiving a wireless television signal at a receiver;
generating a measurement of the wireless television signal;
wherein a position of the receiver is determined based on the measurement of the wireless television signal;
receiving a wireless local area network (WLAN) signal; and
generating a measurement of the WLAN signal;

wherein a position of a transmitter of the WLAN signal is determined based on the position of the receiver and the measurement of the WLAN signal.

15. The method of claim 14, wherein the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w.

16. The method of claim 15, wherein the measurement of the WLAN signal includes at least one of:
a measurement of the received power level of the WLAN signal; and
a media access control (MAC) address of the transmitter of the WLAN signal.

17. The method of claim 15, further comprising:
transmitting a signal representing the measurement of the wireless television signal and the measurement of the WLAN signal.

18. The method of claim 15, further comprising:
determining the position of the receiver.

19. The method of claim 15, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

20. Computer-readable media embodying instructions executable by a computer to perform a method comprising:
generating a measurement of a wireless television signal received at a receiver;
wherein a position of the receiver is determined based on the measurement of the wireless television signal; and
generating a measurement of a wireless local area network (WLAN) signal;
wherein a position of a transmitter of the WLAN signal is determined based on the position of the receiver and the measurement of the WLAN signal.

21. The computer-readable media of claim 20, wherein the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w.

22. The computer-readable media of claim 21, wherein the measurement of the WLAN signal includes at least one of:
a measurement of the received power level of the WLAN signal; and
a media access control (MAC) address of the transmitter of the WLAN signal.

23. The computer-readable media of claim 21, further comprising:
causing transmission of a signal representing the measurement of the wireless television signal and the measurement of the WLAN signal.

24. The computer-readable media of claim 21, further comprising:
determining the position of the receiver.

25. The computer-readable media of claim 21, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

26. An apparatus comprising:
a first receiver to receive a wireless television signal;
a first measurement unit to generate a measurement of the wireless television signal;
a second receiver to receive a wireless local area network (WLAN) signal; and
a second measurement unit to generate a measurement of the WLAN signal;
wherein a position of the apparatus is determined based on the measurement of the wireless television signal and the measurement of the WLAN signal.

27. The apparatus of claim 26, wherein the second receiver is compliant with all or part of IEEE standard 802.11, including draft and approved amendments 802.11a, 802.11b, 802.11e, 802.11g, 802.11i, 802.11k, 802.11n, 802.11v, and 802.11w.

28. The apparatus of claim 27, further comprising:
a position unit to determine the position of the apparatus based on the measurement of the wireless television signal and the measurement of the WLAN signal.

29. The apparatus of claim 28, further comprising:
a transmitter to transmit a signal representing the position of the apparatus.

30. The apparatus of claim 27, further comprising:
a third receiver to receive a satellite positioning signal; and
a third measurement unit to generate a measurement of the satellite positioning signal;
wherein the position of the apparatus is determined based on the measurement of the wireless television signal, the measurement of the WLAN signal, and the measurement of the satellite positioning signal.

31. The apparatus of claim 30, further comprising:
a position unit to determine the position of the apparatus based on the measurement of the wireless television signal, the measurement of the WLAN signal, and the measurement of the satellite positioning signal.

32. The apparatus of claim 27, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

33. An apparatus comprising:
first receiving means for receiving a wireless television signal;
first measuring means for generating a measurement of the wireless television signal;
second receiving means for receiving a wireless local area network (WLAN) signal; and
second measuring means for generating a measurement of the WLAN signal;
wherein a position of the apparatus is determined based on the measurement of the wireless television signal and the measurement of the WLAN signal.

34. The apparatus of claim 33, wherein the second receiving means is compliant with all or part of IEEE standard 802.11, including draft and approved amendments 802.11a, 802.11b, 802.11e, 802.11g, 802.11i, 802.11k, 802.11n, 802.11v, and 802.11w.

35. The apparatus of claim 34, further comprising:
positioning means for determining the position of the apparatus based on the measurement of the wireless television signal and the measurement of the WLAN signal.

36. The apparatus of claim 34, further comprising:
third receiving means for receiving a satellite positioning signal; and
third measuring means for generating a measurement of the satellite positioning signal;
wherein the position of the apparatus is determined based on the measurement of the wireless television signal, the measurement of the WLAN signal, and the measurement of the satellite positioning signal.

37. The apparatus of claim 36, further comprising:
positioning means for determining the position of the apparatus based on the measurement of the wireless television signal, the measurement of the WLAN signal, and the measurement of the satellite positioning signal.

38. The apparatus of claim 34, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

39. A method comprising:
receiving a wireless television signal at a receiver;
generating a measurement of the wireless television signal;
receiving a wireless local area network (WLAN) signal; and
generating a measurement of the WLAN signal;
wherein a position of the receiver is determined based on the measurement of the wireless television signal and the measurement of the WLAN signal.

40. The method of claim 39, wherein the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w.

41. The method of claim 40, further comprising:
determining the position of the receiver based on the measurement of the wireless television signal and the measurement of the WLAN signal.

42. The method of claim 40, further comprising:
receiving a satellite positioning signal; and
generating a measurement of the satellite positioning signal;
wherein the position of the receiver is determined based on the measurement of the wireless television signal, the measurement of the WLAN signal, and the measurement of the satellite positioning signal.

43. The method of claim 42, further comprising:
determining the position of the receiver based on the measurement of the wireless television signal, the measurement of the WLAN signal, and the measurement of the satellite positioning signal.

44. The method of claim 40, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

45. Computer-readable media embodying instructions executable by a computer to perform a method comprising:
generating a measurement of a wireless television signal received at a receiver; and
generating a measurement of a wireless local area network (WLAN) signal;
wherein a position of the receiver is determined based on the measurement of the wireless television signal and the measurement of the WLAN signal.

46. The computer-readable media of claim 45, wherein the WLAN signal is compliant with all or part of IEEE standard 802.11, including draft and approved amendments 802.11a, 802.11b, 802.11e, 802.11g, 802.11i, 802.11k, 802.11n, 802.11v, and 802.11w.

47. The computer-readable media of claim 46, further comprising:
determining the position of the receiver based on the measurement of the wireless television signal and the measurement of the WLAN signal.

48. The computer-readable media of claim 46, further comprising:
generating a measurement of a satellite positioning signal;
wherein the position of the receiver is determined based on the measurement of the wireless television signal, the measurement of the WLAN signal, and the measurement of the satellite positioning signal.

49. The computer-readable media of claim 48, further comprising:
determining the position of the receiver based on the measurement of the wireless television signal, the measurement of the WLAN signal, and the measurement of the satellite positioning signal.

50. The computer-readable media of claim 46, wherein the wireless television signal comprises at least one of:
an American Television Standards Committee (ATSC) digital television (DTV) signal;
a Digital Video Broadcasting-Terrestrial (DVB-T) signal;
a Digital Video Broadcasting-Handheld (DVB-H) signal;
an Integrated Services Digital Broadcasting-Terrestrial (ISDB-T) signal; and
a National Television System Committee (NTSC) analog television signal.

\* \* \* \* \*